Aug. 4, 1942.   F. F. LINDSTAEDT   2,291,909
HORTICULTURAL SPRAY APPARATUS
Filed Jan. 4, 1939
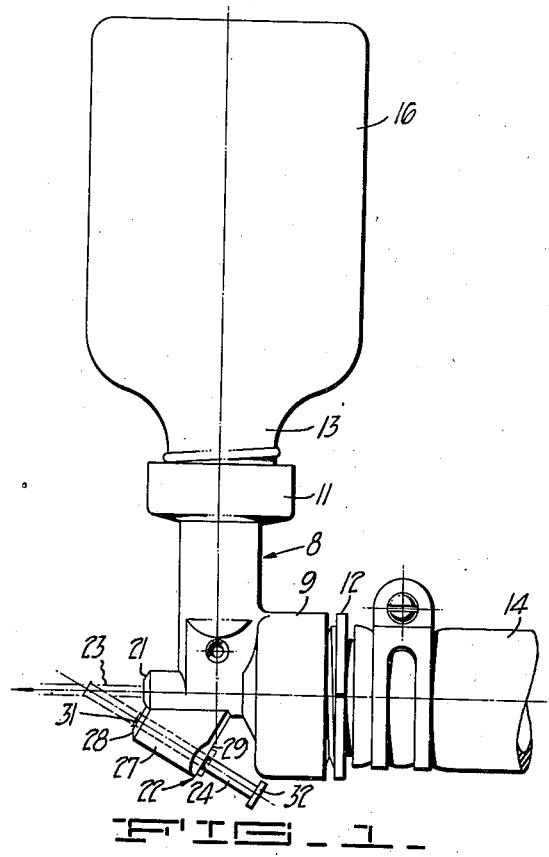
FIG_1_
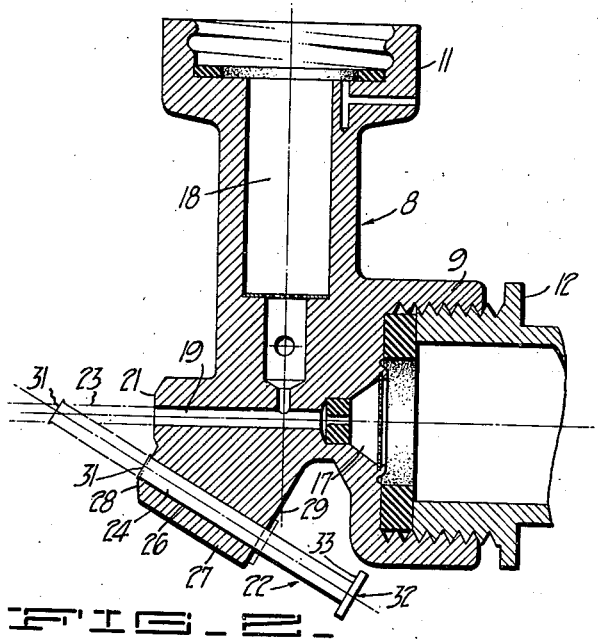
FIG_2_
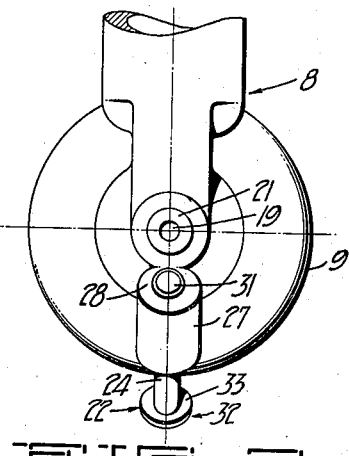
FIG_3_
INVENTOR.
Frank F. Lindstaedt
BY
Joseph B. Gardner
ATTORNEY Patented Aug. 4, 1942

2,291,909

UNITED STATES PATENT OFFICE 2,291,909

HORTICULTURAL SPRAY APPARATUS

Frank F. Lindstaedt, San Francisco, Calif.

Application January 4, 1939, Serial No. 249,212

2 Claims. (Cl. 299—127)

The invention relates to a horticultural spray apparatus and particularly to small sized horticultural sprayers of the type used for spraying gardens, lawns, shrubs and the like, such as disclosed and claimed in my copending application, Serial No. 100,836, filed September 15, 1936, subsequently issued as Patent No. 2,188,366 on Jan. 30, 1940. This application is a continuation-in-part of said copending application. The class of horticultural sprayers to which the device of the present invention is related utilizes generally a concentrated spray liquid which is distributed over a relatively large expanse and decreased in strength by means of a carrier fluid, such as water or the like. In contrast to spray devices generally, and even apparatus used for spraying horticulture on a large scale, the small so-called "garden type" sprayer, to which the present invention relates, presents a unique problem in controlling the distribution and concentration of the spray material. In the first class of apparatus, that is spray devices generally and large commercial horticultural spray rigs, the spray apparatus is usually used for a relatively specific purpose, wherein the character of the spray may be fixed for a relatively constant distance of spraying and distribution of the spray. In the smaller garden type sprayer, however, the spray apparatus is used for spraying all kinds and descriptions of plants, shrubbery, trees, lawns and the like, and some control over the character of the spray discharge is highly desirable. In accordance with the present invention and as a principal object thereof, I have provided a spray apparatus of the character described which may be readily adjusted to control the distribution or spread of the spray discharged from a localized substantially solid jet or pencil for long distance or intense spraying to a finely scattered and widely distributed mist for a wide spread soft spraying of the horticulture.

Another object of the invention is to provide a spray apparatus of the character described, wherein the means for controlling the distribution of the spray is simply and compactly provided on the spray apparatus and is positioned for ready manual engagement and adjustment by the user.

A further object of the invention is to provide a spray apparatus of the character described, wherein the spray stream may be adjusted through wide ranges without the accumulation of spray material on exterior parts of the device and dripping of the material therefrom, as encountered with spray apparatus heretofore used.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claims.

Referring to said drawing:

Figure 1 is a side elevation of a horticultural spray apparatus constructed in accordance with the present invention.

Figure 2 is a somewhat enlarged vertical sectional view of the spray apparatus.

Figure 3 is a front elevation of the spray apparatus.

The spray apparatus of the present invention and as ilustrated in the accompanying drawing comprises a body 8 preferably of metal or other material suitable for casting and which provides a sprayer head. The body, as here shown, is provided with threaded sockets 9 and 11 for the receipt of the ends 12 and 13 of a garden hose 14, and a bottle or other container 16 for spray material. Fluid passages 17 and 18 lead from the sockets 9 and 11 to a discharge passage 19 for the delivery of the water and concentrated spray material in mixed form. The detailed features of construction and operation of the spray apparatus providing for the regulation of fluid flow therethrough, and proper mixing and delivery of the fluids, are more fully described and claimed in my copending application Serial No. 100,836 (Patent No. 2,188,366) aforesaid, and a second copending application, Serial No. 249,211, filed Jan. 4, 1939 and subsequently issued as Patent No. 2,264,539 on December 2, 1941.

The discharge passage 19 preferably extends longitudinally through the body 8 from the passage 17 to the front end 21 of the body and is preferably of substantially constant diameter and is substantially straight so as to produce a solid relatively high velocity jet or pencil discharge of spray material. Preferably, also, the passage 19 is of cylindrical form so as to minimize the frictional resistance within the passage and to thereby increase the velocity and distance carrying ability of the stream discharged. Such a relatively solid stream or pencil of liquid is used principally for spraying shrubbery or trees at a considerable distance from the user or for close-up spraying when a localized and intense spraying is desired.

In accordance with the present invention, I provide the spray apparatus with means for selectively breaking up this relatively strong concentrated stream so as to increase the breadth of distribution of the spray and also to decrease the spray velocity. This means is so arranged that the character of the spray may be widely adjusted from the solid stream aforesaid through successive stages to a finely divided mist-like spray, and in accordance with the present invention, comprises a deflector member 22 which is manually movable into the discharge stream indicated by dotted lines 23 in the drawing, so as to partially or fully contact with the stream. As here shown, the deflector member 22 is carried in the body 8 in inclined relation to the axis of the discharge passage 19 and is manually displaceable so as to extend the deflector into the stream 23 or to retract the same therefrom. Preferably and as here shown, the deflector 22 is in the form of a cylindrical pin 24 which is slidably engaged in a cylindrical guide passage 26 in the body 8 and which passage has its axis inclined to the axis of the discharge passage 19 and is in a substantially common plane therewith, whereby the axes of the two passages intersect at a position forwardly of the end 21. Preferably, the passage 26 is formed in a lateral protuberance 27 on the body and which is arranged with one end 28 thereof adjacent the front end 21 of the body and an opposite end 29 disposed rearwardly of the end 28. The passage 26 extends obliquely through the protuberance 27 and is open at its opposite ends to the end surfaces 28 and 29 of the protuberance. The pin 24 is slidably and rotatably mounted in the passage 26 and is of sufficient length so that the forward end 31 of the pin may be extended forwardly and transversely into the stream 23 without removing the body of the pin from the passage. Preferably, the opposite ends 31 and 32 of the pin are enlarged so as to retain the pin in the passage 26 against longitudinal removal therefrom. The rear end 32 may be formed with an enlarged head 33 for this purpose and the forward end 31 provided with a slight burr or enlarged portion such as may be readily provided by striking or peening such end with a hammer or other suitable tool. The head 33, besides providing a stop for the forward longitudinal movement of the pin in the passage, also provides a convenient means of engagement by the operator for adjusting the longitudinal position of the pin.

I have found that the extension of the cylindrical end 31 of the deflector into the substantially cylindrical stream issuing from the discharge passage, is effective to provide among others, two very important advantages over other deflectors heretofore used. One of these advantages is the complete freedom of the deflector from causing a dripping of spray material therefrom, and the other feature is the greatly improved breaking up of the stream so that with the deflector all the way forward and substantially completely intersecting the stream, an extremely fine spray is produced. The freedom from accumulation of droplets of spray material on the deflector and the consequent dripping of spray material from the deflector as well as the attainment of a fine, mist-like spray, results from the use of the cylindrical shape of the deflector member, and the angular insertion of the deflector into the spray liquid diagonally across and around the cylindrical deflector member apparently causes a reduced pressure about the exposed sides of the member to constantly draw air over such sides and into the stream so as to prevent any accumulation of spray material on the deflector member. As will be understood, various degrees of fineness of spray may be obtained by progressively inserting or withdrawing the end 31 of the deflector into or out of the stream.

I claim:

1. A horticultural spray apparatus comprising, a body having an inlet passage adapted for connection to a source of spray material and a discharge passage opening to an end of said body for discharge of spray material therefrom and having a circular discharge opening for issuing a substantially cylindrical stream of material, said body being provided with a lateral protuberance having a guide passage therethrough inclined to the axis of said discharge opening, and a cylindrical pin of diameter substantially equal to that of said discharge opening and extending through said guide passage and slidably mounted therein and being of sufficient length for positioning of one end thereof across said discharge opening axis at a point spaced from said end.

2. A horticultural spray apparatus comprising, a body having an inlet passage adapted for connection to a source of spray material and a discharge passage opening to an end of said body for discharge of spray material therefrom, and a cylindrical pin carried by said body for longitudinal reciprocation of said pin and mounted along an axis inclined to and substantially in a common plane with the axis of said discharge passage, the inclination of said pin member axis to said discharge passage axis being such that said axes will intersect at a point forwardly of said body along said discharge passage axis, said pin member being of sufficient length whereby one end thereof may be displaced longitudinally of the member axis into the stream issuing from said discharge passage.

FRANK F. LINDSTAEDT.